United States Patent [19]
DeLuca et al.

[11] Patent Number: 5,283,570
[45] Date of Patent: * Feb. 1, 1994

[54] MULTIPLE FORMAT SIGNALLING PROTOCOL FOR A SELECTIVE CALL RECEIVER

[75] Inventors: Joan S. DeLuca; Michael J. DeLuca, both of Boca Raton, Fla.

[73] Assignee: Motorola, Inc., Schaumburg, Ill.

[*] Notice: The portion of the term of this patent subsequent to Sep. 8, 2009 has been disclaimed.

[21] Appl. No.: 658,451

[22] Filed: Feb. 22, 1991

Related U.S. Application Data

[63] Continuation of Ser. No. 450,494, Dec. 14, 1989, abandoned.

[51] Int. Cl.$^5$ .............................................. G08B 5/22
[52] U.S. Cl. ........................ 340/825.40; 340/825.44; 455/38.11
[58] Field of Search .................... 340/825.44, 311.1; 455/31, 38, 31.1, 38.1, 38.2, 38.4; 379/57, 63

[56] References Cited

U.S. PATENT DOCUMENTS

| | | | |
|---|---|---|---|
| 4,766,434 | 8/1988 | Matai et al. | 340/825.44 |
| 4,849,750 | 7/1989 | Andros et al. | 340/825.44 |
| 4,870,402 | 9/1989 | DeLuca et al. | 340/825.44 |
| 4,870,403 | 9/1989 | Mori et al. | 340/825.44 |
| 4,959,644 | 9/1990 | Sato | 340/825.44 |
| 5,146,216 | 9/1992 | DeLuca et al. | 340/825.44 |

Primary Examiner—Donald J. Yusko
Assistant Examiner—J. Grust
Attorney, Agent, or Firm—William E. Koch; Thomas G. Berry

[57] ABSTRACT

A selective call receiver comprises a receiver for receiving a signal, the signal comprising an address identifying the selective call receiver, a first information packet having a first information format, a second information packet having a second information format, and a control character. An output device presents the first information packet in a first output mode corresponding to the first information format in response to the control character, and the second information packet in a second output mode corresponding to the second information format in response to the address or a second control character.

29 Claims, 2 Drawing Sheets

| PREAMBLE | CODE | $A_1$ | $CC_1$ | $M_1A_1$ | ... | $CC_1$ | $M_1A_N$ | $CC_2$ | $M_2V_1$ | ... | $CC_2$ | $M_2V_N$ | $CC_3$ | $M_3N_1$ | ... | $CC_3$ | $M_3N_N$ |

FIG. 2

| PREAMBLE | CODE | $A_1$ | $M_{1A}$ | $CC_1$ | $M_{2V}$ | $CC_2$ | $M_{3N}$ | $CC_3$ | $M_{4G}$ |

FIG. 3

| PREAMBLE | CODE | $A_1$ | $CC_1$ | $M_{1A_1}$ | ... | $CC_1$ | $M_{1A_N}$ | $CC_2$ | $M_{2V_1}$ | ... | $CC_2$ | $M_{2V_N}$ | $CC_3$ | $M_{3N_1}$ | ... | $CC_3$ | $M_{3N_N}$ |

FIG. 4

| PREAMBLE | CODE | $A_1$ | $CC_1$ | $LD_1$ | $CC_2$ | $LD_2$ | $CC_3$ | $LD_3$ | $CC_4$ | $M_{1A}$ | $M_{2V}$ | $M_{3N}$ |

MULTIPLE FORMAT SIGNALLING PROTOCOL FOR A SELECTIVE CALL RECEIVER

This is a continuation of application Ser. No. 07/450,494, filed Dec. 14, 1989 and now abandoned.

FIELD OF THE INVENTION

This invention relates in general to selective call receivers and more specifically to a selective call receiver signalling format having a single address and accommodating two or more information formats including, for example, BCD, ASCII, pixal, and digital or analog for providing an output mode in numeric, alphanumeric, graphic, and voice, respectively.

BACKGROUND OF THE INVENTION

Several protocols have been designed for transferring messages to selective call receivers. These protocols include POCSAG (Great Britain's Post Office Code Standardization Advisory Group) and GSC (Golay Sequential Code). A message comprises an address if the message is a tone only message, or an address and information if the message is a data message. The information in a data message conventionally comprised one of several output modes (transmitted in information formats) including numeric (transmitted by BCD), alphanumeric (transmitted by ASCII), or voice (transmitted by digital or analog).

A preamble of a POCSAG signal comprises a number of zero-to-one transitions for bit synchronization. The first word following the preamble is a sync code word which contains a predetermined binary sequence used for frame synchronization. Sixteen words of information, each comprising a selective call address and an associated message, follow before the sync code is repeated. The structure of the addresses and information may be referred to as the signalling format.

In a GSC selective call network, the receivers are divided into a plurality of groups and a twenty three bit code in the preamble selects one of the groups in addition to providing means for bit and frame synchronization. Following the preamble, a start code indicates that the preamble is finished and the information following contains selective call addresses of selective call receivers within the group and messages for those selective call receivers in a pattern of sixteen information words followed by one start code word.

However, in both POCSAG and GSC, as in other known protocols, the information following each of the addresses comprised only one information format. Each address would specify to the selective call receiver receiving that address whether its output mode following would be numeric, alphanumeric, or voice. The selective call receiver would thereby encode the proper information format as transmitted, e.g., BCD or ASCII.

Thus, what is needed is a selective call receiver signalling format having a single address and accommodating two or more information formats.

SUMMARY OF THE INVENTION

Accordingly, it is an object of the present invention to provide a selective call receiver signalling format having a single address and accommodating two or more information formats.

In carrying out the above and other objects of the invention in one form, there is provided a selective call receiver comprising a receiver for receiving a signal; the signal comprising an address identifying the selective call receiver, a first information packet having a first information format, a second information packet having a second information format, and a control character; and an output device for presenting the first information packet in a first output mode corresponding to the first information format in response to the control character, and the second information packet in a second output mode corresponding to the second information format.

BRIEF DESCRIPTION OF THE DRAWINGS

FIG. 2 is a diagram of the signalling format in accordance with a first embodiment.

FIG. 3 is a diagram of the signalling format in accordance with a second embodiment.

FIG. 4 is a diagram of the signalling format in accordance with a third embodiment.

DETAILED DESCRIPTION OF THE INVENTION

Figure 1:
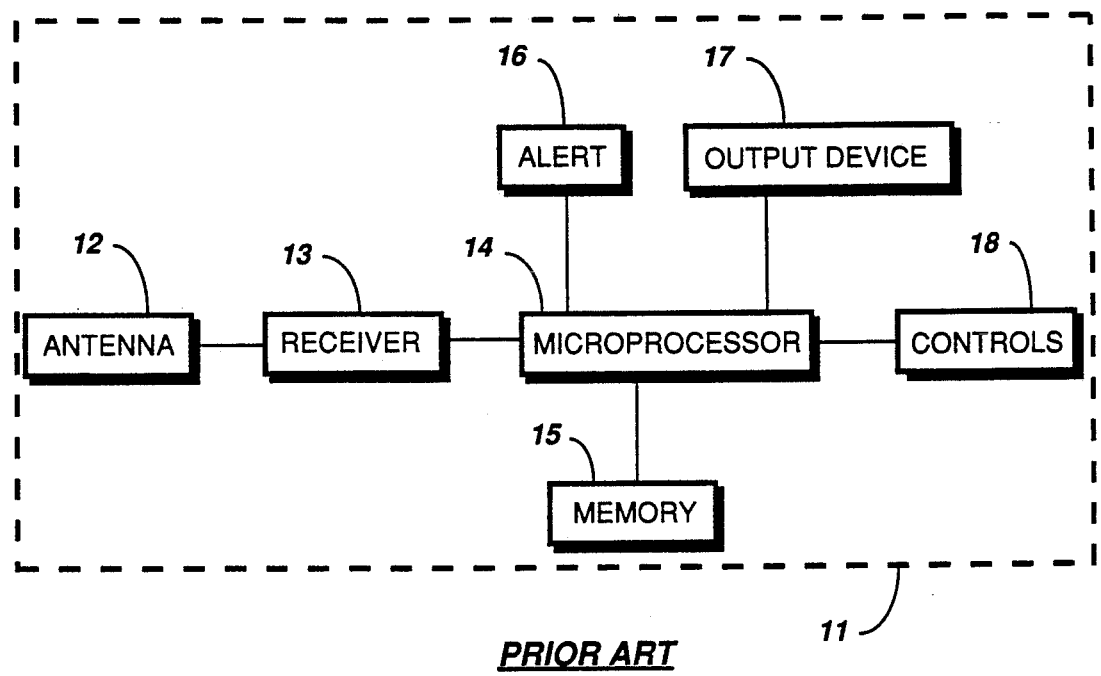
FIG. 1 is a block diagram of a conventional selective call receiver.

Referring to FIG. 1, a transmitter 10 sends signals to an electronic device 11 such as a selective call receiver including a pager comprises an antenna 12 for receiving the signals coupled to a receiver circuit 13 which demodulates the signals received. A memory 15 is coupled to the microprocessor 14 for storing those messages containing the address of the selective call receiver 11 as determined by the microprocessor 14. The portion of the memory 15 in which the address or addresses are stored is generally referred to as the code plug. The microprocessor 14 also controls the storing and recalling of those messages. An alert device 16 provides an alert, i.e., audible, visual or tactile, to the user that a message has been received and is ready to be presented. An output device 17 may be a visual display for presenting the message in a numeric mode, a graphic mode or an alphanumeric mode, for example, and/or a speaker controlled by the microprocessor 14 for presenting the message in an audible mode. The controls 18 allow the user to command the microprocessor 14 to perform the selective call receiver 11 operations well known to those skilled in the art and typically include control switches such as an on/off control button, a function control, etc. For a more detailed description of the structure and operation of a selective call radio paging receiver of the type shown in FIG. 1, reference is made to U.S. Pat. No. 4,518,961, U.S. Pat. No. 4,649,538, and U.S. Pat. No. 4,755,816, all commonly assigned to the assignee of the present invention, and the teachings of which are hereby incorporated by reference.

Referring to FIG. 2, the signalling format in accordance with a first embodiment of the present invention is structured so it can coexist with present selective call protocols such as GSC (Motorola's Golay Sequential Code) or POCSAG (Great Britain's Post Office Code Standardization Advisory Group) on a single or multiple frequency channels. The signalling format comprises a preamble, a code word, an address $A_1$, messages $M_{1A}$, $M_{2V}$ and $M_{3N}$ and control characters $CC_1$ and $CC_2$. The preamble and code word for example, in POCSAG, provides bit and frame synchronization, respectively. In GSC, the preamble provides both bit and frame synchronization and the code word generally is a start code for the subsequent information. The address $A_1$ identifies the desired selective call receiver or receivers in a manner well known to those skilled in the art. The address $A_1$ informs the selective call receiver that the following message $M_{1A}$ is transmitted in an ASCII information format and will be presented in an alphanumeric output mode. The control character $CC_1$ informs the selective call receiver that the message $M_{2V}$ immediately following is transmitted in a digital or analog information format and will be presented in an aural (voice) output mode. The control character $CC_2$ informs the selective call receiver that the message $M_{3N}$ immediately following is transmitted in a BCD information format and will be presented in a numeric output mode. The control character $CC_3$ informs the selective call receiver that the message $M_{4N}$ immediately following is transmitted in a pixal or a data stream information format corresponding to FAX 1, FAX 2, FAX 3, or FAX 4 protocols, for example, and will be presented in a graphic output mode.

Referring to FIG. 3, a second embodiment of the signalling format comprises an address $A_1$, messages $M_{1A}$, $M_{2V}$ and $M_{3N}$ and control characters $CC_1$, $CC_2$ and $CC_3$. In this embodiment, the address does not specify a format; however, the control characters $CC_1$, $CC_2$ and $CC_3$ precede each of the words of messages $M_{1A}$, $M_{2V}$ and $M_{3N}$, respectively, thereby informing the selective call receiver in which the following message or messages will be received and presented. In the POCSAG format having a 21 bit word and 10 bit parity in the known 31/21 bit format, the control characters $CC_1$, $CC_2$ and $CC_3$ may each comprise the first three bits of the 21 bit words with the 10 bits for parity immediately following the 21 bit word. For example, the control character $CC_1$ may comprise the bits "000", the control character $CC_2$ may comprise the bits "001", and the control character $CC_2$ may comprise the bits "010". Since the control signal is transmitted with each word, this embodiment provides immunity to control signals being corrupted by noise. Other information formats, i.e., pixel or graphic stream may be transmitted in a similar manner.

Referring to FIG. 4, a third embodiment of the signalling format comprises an address $A_1$, messages $M_{1A}$, $M_{2V}$ and $M_{3N}$, control characters $CC_1$, $CC_2$, $CC_3$ and $CC_4$, and message length designators $LD_1$, $LD_2$, and $LD_3$. Each of the message length designators $LD_1$, $LD_2$, and $LD_3$ define the length of the respective messages $M_{1A}$, $M_{2V}$ and $M_{3N}$. The control character $CC_4$ indicates that it is the last control character and the messages follow immediately thereafter. Other information formats, i.e., graphics pixel or data stream, may be transmitted in a similar manner.

It should be apparent in each of the three embodiments illustrated, that each of the messages $M_{1A}$, $M_{2V}$ and $M_{3N}$ may alternatively comprise several messages in each information format, respectively, and may be interchanged in order. Furthermore, any number of information formats may be transmitted with a single address wherein the information is transmitted in an efficient information format, i.e., a number character may be transmitted using only four bits in a BCD format, an alpha character may be transmitted using only seven bits in an ASCII format, and graphic information may be transmitted in a pixel format or one of the FAX formats. Transmitting each output mode in an optimum information format provides for efficient usage of a paging channel. For example, transmitting a number or an alpha character in a graphic format would require at least 35 pixel bits and transmitting numbers in an ASCII format would require seven bits.

We claim:

1. A selective call receiver comprising:
   receiver means for receiving a signal, the signal comprising:
   an address identifying the selective call receiver;
   an information packet associated with the address comprising a first information format and a second information format; and
   a control character; and
   presentation means for presenting the first information format in a first output mode in response to the address and the second information format in a second output mode in response to the control character.

2. The selective call receiver according to claim 1 wherein the first output mode comprises a numeric display.

3. The selective call receiver according to claim 1 wherein the second output mode comprises an alphanumeric display.

4. The selective call receiver according to claim 1 wherein the second output mode comprises an audible output.

5. The selective call receiver according to claim 1 wherein the second output mode comprises a graphics output.

6. A selective call receiver comprising:
   receiver means for receiving a signal, the signal comprising:
   an address identifying the selective call receiver;
   a first information packet associated with the address comprising a first information format;
   a second information packet associated with the address comprising a second information format; and
   a first control character; and
   presentation means for presenting the first information packet in a first output mode corresponding to the first information format in response to the first control character, and the second information packet in a second output mode corresponding to the second information format.

7. The selective call receiver according to claim 6 wherein the second information packet is presented in response to the address.

8. The selective call receiver according to claim 6 wherein the signal further comprises a second control signal, the second information packet being presented in response thereto.

9. The selective call receiver according to claim 6 wherein one of the first and second output modes comprises a numeric display.

10. The selective call receiver according to claim 9 wherein the other of the first and second output modes comprises an alphanumeric display.

11. The selective call receiver according to claim 9 wherein the other of the first and second output modes comprises an audible output.

12. The selective call receiver according to claim 6 wherein one of the first and second output modes comprises an alphanumeric display.

13. The selective call receiver according to claim 12 wherein the other of the first and second output modes comprises an audible output.

14. The selective call receiver according to claim 6 wherein the output mode comprises a graphics display.

15. A selective call receiver system comprising:
transmitter means for transmitting a signal;
receiver means for receiving the signal, the signal comprising:
an address identifying the selective call receiver;
a first information packet associated with the address comprising a first information format and a second information format; and
a first control character; and
presentation means for presenting the first information packet in a first output mode in response to the first control character.

16. The selective call receiver according to claim 15 wherein the first output mode comprises a numeric display.

17. The selective call receiver according to claim 15 wherein the first output mode comprises an alphanumeric display.

18. The selective call receiver according to claim 15 wherein the first output mode comprises an audible output.

19. The selective call receiver according to claim 15 wherein the output mode comprises a graphics display.

20. The selective call receiver system according to claim 15 wherein the signal further comprises a second information packet comprising a second information format, the presentation means presenting the second information packet in a second output mode corresponding to the second information format.

21. The selective call receiver according to claim 20 wherein the second information packet is presented in response to the address.

22. The selective call receiver according to claim 20 wherein the signal further comprises a second control signal, the second information packet being presented in response thereto.

23. The selective call receiver according to claim 20 wherein one of the first and second output modes comprises a numeric display.

24. The selective call receiver according to claim 23 wherein the other of the first and second output modes comprises an alphanumeric display.

25. The selective call receiver according to claim 23 wherein the other of the first and second output modes comprises an audible output.

26. The selective call receiver according to claim 20 wherein one of the first and second output modes comprises an alphanumeric display.

27. The selective call receiver according to claim 26 wherein the other of the first and second output modes comprises an audible output.

28. The selective call receiver according to claim 20 wherein the output mode comprises a graphics output.

29. In a selective call receiver, a method comprising the steps of:
receiving a signal having a single address, a control character, and first and second information packets; and
presenting information encoded from the first packet in a first output mode and from the second packet in a second output mode, the presention of the second packet in the second output mode being determined by the control character.

* * * * *